United States Patent
Kim et al.

(10) Patent No.: US 9,823,465 B2
(45) Date of Patent: Nov. 21, 2017

(54) HYBRID ORGANIC-INORGANIC MICROMIRROR DEVICE AND METHOD OF MAKING A HYBRID MICRODEVICE

(71) Applicant: The Board of Trustees of the University of Illinois, Urbana, IL (US)

(72) Inventors: Seok Kim, Champaign, IL (US); Zining Yang, Urbana, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 0 days.

(21) Appl. No.: 15/015,240

(22) Filed: Feb. 4, 2016

(65) Prior Publication Data

US 2016/0231559 A1    Aug. 11, 2016

Related U.S. Application Data

(60) Provisional application No. 62/113,099, filed on Feb. 6, 2015.

(51) Int. Cl.
  *G02B 26/08* (2006.01)
  *G02B 1/02* (2006.01)
  (Continued)

(52) U.S. Cl.
  CPC ........... *G02B 26/0841* (2013.01); *G02B 1/02* (2013.01); *B29C 39/025* (2013.01);
  (Continued)

(58) Field of Classification Search
  CPC ... B29C 39/025; B29C 66/742; B29C 66/746; B29C 66/712; B29C 65/00;
  (Continued)

(56) References Cited

U.S. PATENT DOCUMENTS 6,751,009 B2    6/2004    Khoshnevisan et al.
2004/0012460 A1    1/2004    Cho et al.
(Continued)

FOREIGN PATENT DOCUMENTS

EP    2 784 566 A1    10/2014

OTHER PUBLICATIONS

Armani, Deniz et al., "Re-Configurable Fluid Circuits by PDMS Elastomer Micromachining," *Micro Electro Mechanical Systems* (*MEMS* '99), Twelfth IEEE International Conference (1999) pp. 222-227.
(Continued)

*Primary Examiner* — Euncha Cherry
(74) *Attorney, Agent, or Firm* — Brinks Gilson & Lione

(57) ABSTRACT

A hybrid organic-inorganic micromirror device includes a micromirror comprising an inorganic material positioned above an elastomeric substrate. The micromirror is supported on an underside thereof by a conductive elastomeric support protruding from the elastomeric substrate. The conductive elastomeric support may function as a universal joint and is rendered electrically conductive by an electrically conductive coating thereon. A plurality of electrodes are disposed on the elastomeric substrate under the micromirror. The electrodes are spaced apart from each other and from the micromirror and are arranged around the conductive elastomeric support. Each electrode comprises an inorganic material and is in electrical contact with an elastomeric contact region protruding from the elastomeric substrate. When a voltage bias is applied between the micromirror and one or more of the electrodes, the micromirror is electrostatically actuated to move in a predetermined direction.

11 Claims, 6 Drawing Sheets

(51) Int. Cl.
   *B29C 39/02* (2006.01)
   *B29K 83/00* (2006.01)
   *B29K 105/00* (2006.01)
   *B29L 11/00* (2006.01)

(52) U.S. Cl.
   CPC .. *B29K 2083/00* (2013.01); *B29K 2105/0058* (2013.01); *B29L 2011/0058* (2013.01)

(58) Field of Classification Search
   CPC ........ B29L 2011/0058; B29K 2083/00; B29K 2105/0058; G02B 26/0841; G02B 1/02; G02B 26/08
   USPC ...................................................... 359/221.2
   See application file for complete search history.

(56) References Cited

U.S. PATENT DOCUMENTS

| | | |
|---|---|---|
| 2004/0165250 A1 | 8/2004 | Aubuchon |
| 2006/0038182 A1* | 2/2006 | Rogers ................... B82Y 10/00 257/77 |
| 2010/0149622 A1 | 6/2010 | McAvoy et al. |

OTHER PUBLICATIONS

Bhaswara, A. et al., "Fabrication of Nanoplate Resonating Structures Via Micro-Masonry," *J. Micromech. Microeng.*, 24 (2014) pp. 115012-115019.

Duffy, David C. et al., "Rapid Prototyping of Microfluidic Systems in Poly(dimethylsiloxane)," *Anal. Chem.*, 70 (1998) pp. 4974-4984.

Jung, Il Woong et al., "High Fill-Factor Two-Axis Gimbaled Tip-Tilt-Piston Micromirror Array Actuated by Self-Aligned Vertical Electrostatic Combdrives," *Journal of Microelectromechanical Systems*, 15, 3 (2006) pp. 563-571.

Kim, Seok et al., "Imbricate Scales as a Design Construct for Microsystem Technologies," *Small*, 8, 6 (2012) pp. 901-906.

Kim, Seok et al., "Microstructured Elastomeric Surfaces with Reversible Adhesion and Examples of their Use in Deterministic Assembly by Transfer Printing," *PNAS*, 107, 40 (2010) pp. 17095-17100.

Milanovic, Veljko et al., "Gimbal-Less Monolithic Silicon Actuators for Tip-Tilt-Piston Micromirror Applications," *IEEE Journal of Selected Topics in Quantum Electronics*, 10, 3 (2004) pp. 462-471.

Ning, Hailong et al., "Transfer-Printing of Tunable Porous Silicon Microcavities with Embedded Emitters," *ACS Photonics*, 1 (2014) pp. 1144-1150.

Solgaard, Olav et al., "Optical MEMS: From Micromirrors to Complex Systems," *Journal of Microelectromechanical Systems*, 23, 3 (2014) pp. 517-538.

Tsai, Jui-che et al., "Gimbal-Less MEMS Two-Axis Optical Scanner Array With High Fill-Factor," *Journal of Microelectromechanical Systems*, 14, 6 (2005) pp. 1323-1328.

Tung, Yi-Chung et al., "A Single-Layer PDMS-on-Silicon Hybrid Microactuator With Multi-Axis Out-of-Plane Motion Capabilities—Part II: Fabrication and Characterization," *Journal of Microelectromechanical Systems*, 14, 3, (2005) pp. 558-566.

Zeng, Hongjun et al., "Tilting Micromirror With a Liquid-Metal Pivot," *Journal of Microelectromechanical Systems*, 15, 6 (2006) pp. 1568-1575.

Zhang, Yong et al., "Micro-Masonry of MEMS Sensors and Actuators," *Journal of Microelectromechanical Systems*, 23, 2 (2013) pp. 308-314.

* cited by examiner

| Torsion | Bending | Shearing | Tension |
|---|---|---|---|
| $f = 0.76$ kHz | $f = 0.1.27$ | $f = 4.81$ kHz | $f = 9.94$ |

HYBRID ORGANIC-INORGANIC MICROMIRROR DEVICE AND METHOD OF MAKING A HYBRID MICRODEVICE

RELATED APPLICATIONS

The present patent document claims the benefit of priority under 35 U.S.C. §119(e) to U.S. Provisional Patent Application No. 62/113,099, filed Feb. 6, 2015, which is hereby incorporated by reference in its entirety.

FEDERALLY SPONSORED RESEARCH OR DEVELOPMENT

This invention was made with government support under contract number 917 NSF CMMI 13-51370 CAR awarded by the National Science Foundation. The government has certain rights in the invention.

TECHNICAL FIELD

The present disclosure is related generally to microfabrication technology and more specifically to a hybrid organic-inorganic micromirror device.

BACKGROUND

Microelectromechanical systems (MEMS) technology-based micromirrors are having an impact on areas such as projection displays, telecommunications, adaptive optics and biomedical imaging. Common silicon-based MEMS micromirrors are designed with an optical reflector suspended on a set of silicon torsional springs. Monolithic microfabrication including surface micromachining and bulk micromachining processes are typically used to realize such structures. However, the conventional design and fabrication approaches exhibit several fundamental challenges. Silicon is susceptible to cleavage fracture under large deformations as well as to fatigue failure under cyclic loading. In addition, microscale springs are usually needed to obtain a reasonable (low) stiffness due to the high elastic modulus of silicon, and such small features are susceptible to photolithographic errors. Finally, complex mechanical design and fabrication steps are typically required to realize a two-axis micromirror. A gimbaled structure may provide an additional degree of freedom to enable two-axis motion, but it suffers from limitations, such as a large footprint and unequal frequency responses with respect to the two axes.

BRIEF SUMMARY

Described herein is a hybrid organic-inorganic micromirror device that has advantages over previous micromirror assemblies. Also described is a method of making a hybrid organic-inorganic microelectromechanical systems (MEMS) device.

The micromirror device includes a micromirror comprising an inorganic material positioned above an elastomeric substrate. The micromirror is supported on an underside thereof by a conductive elastomeric support protruding from the elastomeric substrate. The conductive elastomeric support may function as a universal joint and is rendered electrically conductive by an electrically conductive coating thereon. A plurality of electrodes are disposed on the elastomeric substrate under the micromirror. The electrodes are spaced apart from each other and from the micromirror and are arranged around the conductive elastomeric support. Each electrode comprises an inorganic material and is in electrical contact with an elastomeric contact region protruding from the elastomeric substrate. When a voltage bias is applied between the micromirror and one or more of the electrodes, the micromirror is electrostatically actuated to move in a predetermined direction.

The method entails forming a plurality of trenches in a surface of a mold, and coating the trenches with an electrically conductive coating. An uncured elastomer is applied to the surface of the mold so as to fill the trenches and cover the surface. The uncured elastomer is partially cured to form a tacky elastomeric body comprising protruding regions defined by the trenches. The protruding regions contact the electrically conductive coating and attach thereto. The tacky elastomeric body is removed from the mold, and the electrically conductive coating is transferred with the protruding regions during the removal. The tacky elastomeric body may be flipped over to form a receiver substrate comprising conductive-coated protrusions. A plurality of functional inorganic components are placed on the receiver substrate, where each functional inorganic component is in contact with one of the conductive-coated protrusions. The receiver substrate is fully cured to bond the functional inorganic components to the conductive-coated protrusions.

DETAILED DESCRIPTION

Hybrid organic-inorganic MEMS devices such as micromirrors that include both inorganic and organic components mechanically and electrically integrated together are described herein. An exemplary micromirror device driven by electrostatic actuation is based on a highly doped silicon mirror (inorganic component) that is mechanically bonded and electrically connected to a conductive elastomeric universal joint (organic component). To realize such hybrid organic-inorganic MEMS devices, newly developed transfer printing-based microassembly techniques that allow the inorganic and organic components to be fabricated separately and integrated afterwards may be employed.

Figure 1A:
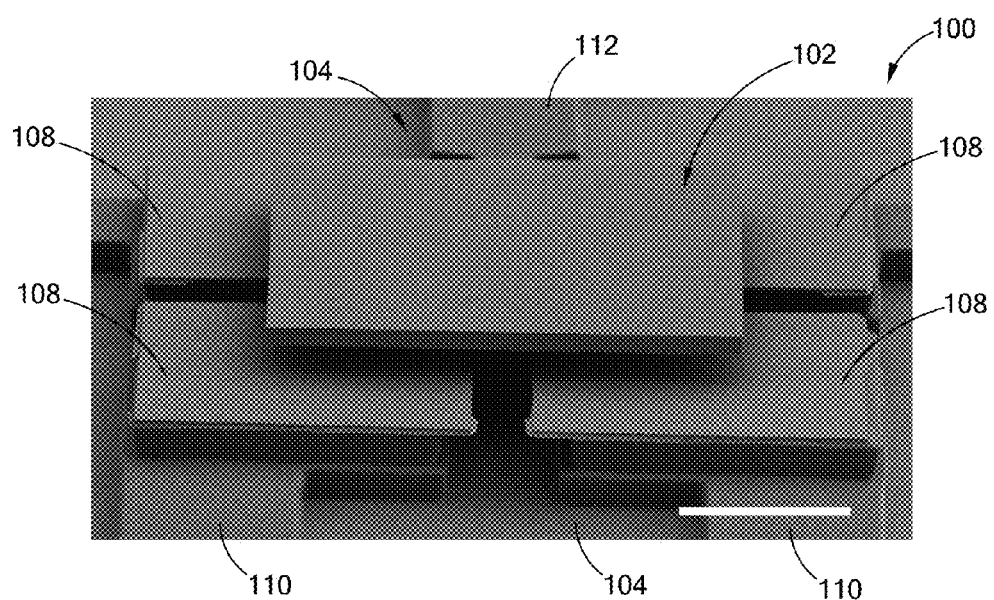
FIGS. 1A and 1B are scanning electron microscope (SEM) images of an exemplary fabricated micromirror device. The scale bars are 200 microns.
Figure 1B:
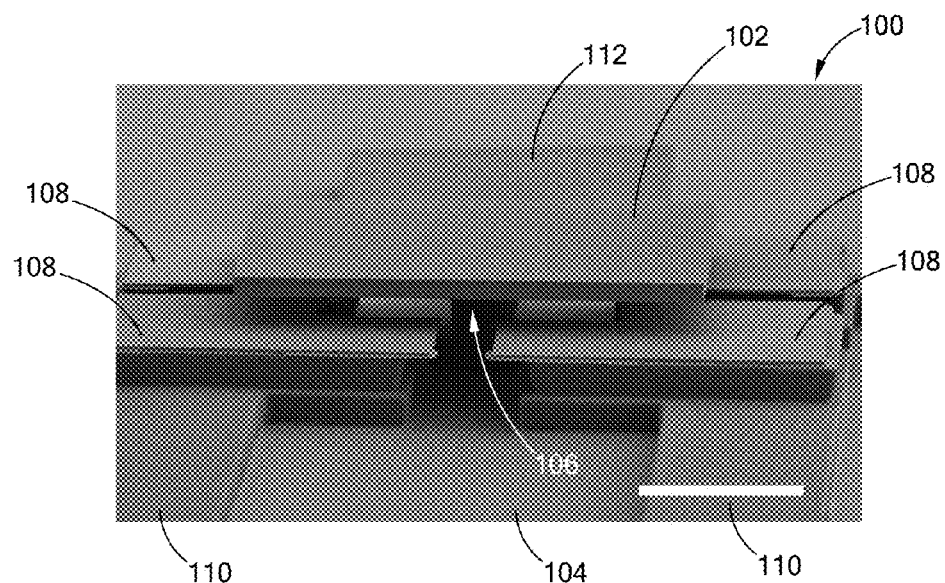

An exemplary micromirror device 100 is shown in the scanning electron microscope (SEM) images of FIGS. 1A and 1B. A micromirror 102 comprising an inorganic material is positioned above an elastomeric substrate 104. The micromirror 102 is supported on an underside thereof by a conductive elastomeric support 106 that protrudes from the elastomeric substrate 104 and functions as a universal joint to permit multi-directional motion of the micromirror 102. Both the elastomeric substrate 104 and the conductive elastomeric support 106 comprise an elastomer. The conductive elastomeric support 106 may be rendered electrically conductive by an electrically conductive coating thereon. The electrically conductive coating may also overlie an additional portion of the elastomeric substrate to form a conductive extension portion 112 in electrical contact with the conductive elastomeric support 106.

A plurality of (at least two) electrodes 108 are disposed on the elastomeric substrate 104 under the micromirror 102. The electrodes 108 are spaced apart from each other and from the micromirror 102 and are arranged around the conductive elastomeric support 106. Each electrode 108 comprises an inorganic material and is in electrical contact with an elastomeric contact region 110 protruding from the elastomeric substrate 104. Each elastomeric contact region 110 comprises an elastomer and may be rendered electrically conductive by an electrically conductive coating thereon.

The micromirror 102 and the electrodes 108 may form a parallel-plate electrostatic actuator. When a voltage bias is applied to one or more of the electrodes (e.g., via one or more of the elastomeric contact regions 110) and to the micromirror (e.g., via the conductive elastomeric support 106 and the conductive extension portion 112), the micromirror 102 may be electrostatically actuated to move in a predetermined direction. A voltage bias of at least 10 V, at least 20 V or at least 40 V may be suitable for electrostatic actuation. Typically, the voltage bias is 100 V or less, and may be 80 V or less, or 60 V or less. Due to the flexibility of the elastomer, the hybrid organic-inorganic micromirror device can sustain enormous deformations and accommodate three-dimensional motion, such as tip-tilt-piston, with a compact gimbal-less design.

As described in detail below in reference to FIGS. 2A-2H, the elastomeric contact regions 110 and the conductive elastomeric support 106 may be integrally formed with the elastomeric substrate 104 as a monolithic elastomeric body that includes a substantially nonconductive bulk portion 136 and a number of conductive surface portions 128 (e.g., the elastomeric contact regions, the conductive elastomeric support, and/or the conductive extension portion). The conductive surface portions 128 may be rendered conductive by application of an electrically conductive coating 120 thereto, and may also be referred to as conductive-coated protrusions 128.

The electrically conductive coating may comprise a plurality of conductive particles. The conductive particles may be arranged in one or more layers or in another percolating arrangement that covers all or at least a portion of the elastomeric region of interest. The conductive particles may comprise any suitably electrically conductive material, such as carbon, a metal or an alloy. For example, the conductive particles may be selected from the group consisting of: carbon particles (e.g., carbon black), carbon nanotubes and metal particles. The size of the conductive particles typically ranges from the nanoscale to the microscale (e.g., from about 1 nm to about 10 microns in average diameter or width, or from about 10 nm to about 1 micron in average diameter or width). Suitable conductive particles may include VULCAN® XC-72 carbon black particles produced by Cabot Corporation (Boston, Mass.).

The elastomeric body, including the elastomeric substrate, the elastomeric contact regions, the conductive elastomeric support and/or the conductive extension portion, may comprise one or more elastomers selected from the group consisting of polydimethylsiloxane (PDMS) and polyurethane (PU). In the example described below, PDMS (e.g., Sylgard® 184 from Dow Corning) is employed due to its excellent mechanical properties and well-established fabrication processes.

The micromirror and the electrodes may comprise the same inorganic material or different inorganic materials. The inorganic material advantageously has a low resistivity so as to be electrically conductive, and it may be single crystalline or polycrystalline in structure. Suitable inorganic materials may include metals, alloys, or doped semiconductors. In one example, the inorganic material may be doped silicon or, more specifically, single-crystalline doped silicon. The doped silicon or other doped semiconductor may include one or more suitable dopants, such as boron and/or phosphorus, preferably at a dopant level sufficient to achieve a resistivity $\rho$ of about 0.01 $\Omega$-cm or less, about 0.005 $\Omega$-cm or less, or about 0.001 $\Omega$-cm or less. Highly doped single-crystalline silicon may be obtained from Ultrasil Corporation (Hayward, Calif.), for example.

To achieve tilting of the micromirror about a single axis, the micromirror device may be constructed using two electrodes, and the elastomeric substrate may include two elastomeric contact regions. Advantageously, to permit tilting of the micromirror in any direction, four (or more) electrodes may be used in conjunction with four (or more) elastomeric contact regions. The conductive elastomeric support may be referred to as a universal joint because it can permit translational and rotational motion of the micromirror in any direction (e.g., x translation, y translation, z translation, x rotation, y rotation, z rotation).

The dimensions of the micromirror and the spacing between the micromirror and the electrodes may be influenced by the size and stiffness of the conductive elastomeric support. Typically, the micromirror may have a length and/or width in the range of from about 10 microns to about 1 mm. The length and width of the micromirror may be the same, as shown in FIGS. 1A and 1B, or different. The thickness of the micromirror is typically considerably smaller than the length or width (e.g., about 30% or less, or about 10% or less, of the length or width). The electrodes may have similar or smaller dimensions to the micromirror. In the example shown in FIGS. 1A and 1B, the mirror and the electrodes have dimensions of 500×500×20 $\mu m^3$ and 350×350×3 $\mu m^3$, respectively, and the conductive elastomeric support (or universal joint) has a cylindrical shape with a height of 80 microns and a diameter of 60 microns. The conductive elastomeric support need not be cylindrical, although this shape may be advantageous to promote symmetric tilting of the micromirror. Generally speaking, the conductive elastomeric support may have a height in the range of from about 10 microns to about 200 microns and a diameter or thickness from about 5 microns to about 150 microns. The air gap between the mirror and the electrodes in the example of FIGS. 1A and 1B is 37 microns, but may more generally range from about 5 microns to about 100 microns.

A method of making a hybrid organic-inorganic microelectromechanical systems (MEMS) device, such as the micromirror device described above, is now described in reference to FIGS. 2A-2H.

Figure 2A:
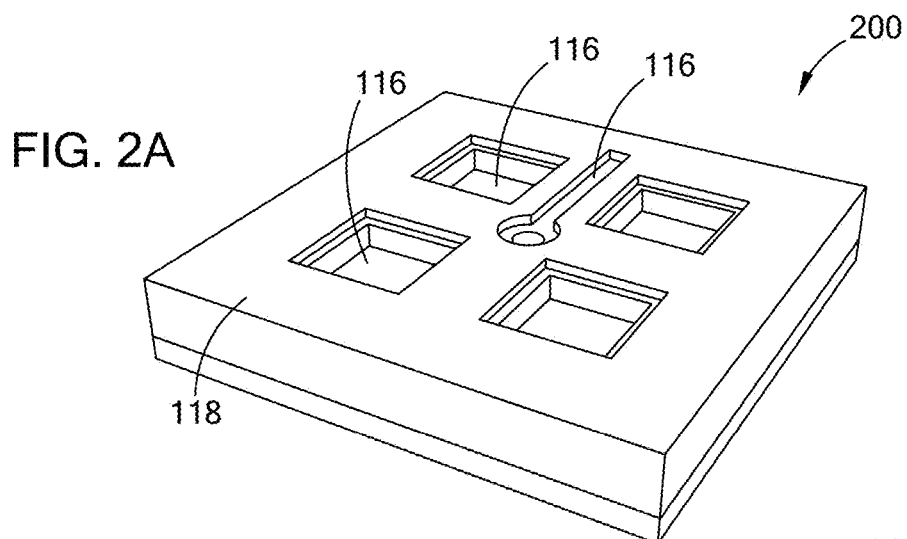
FIGS. 2A-2C show exemplary steps in fabricating a partially-cured elastomeric body that includes conductive surface portions and may be used as a receiver substrate.
Figure 2B:
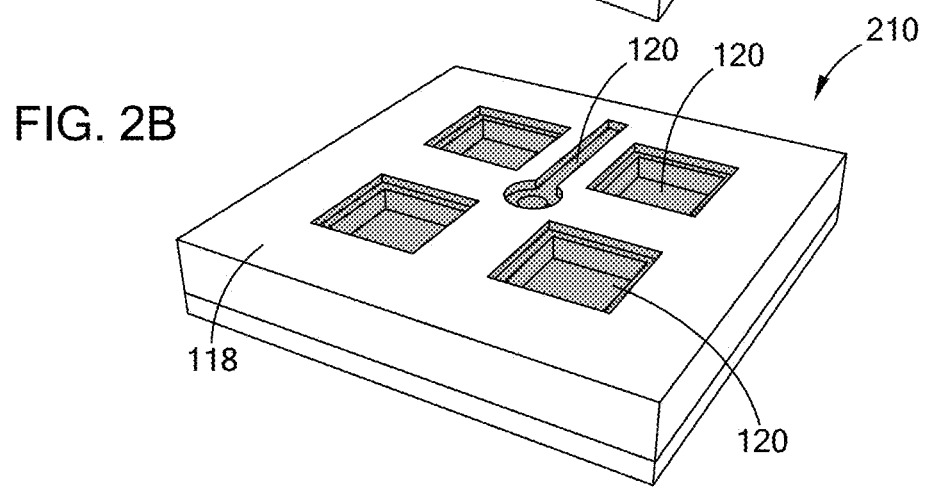
Figure 2C:
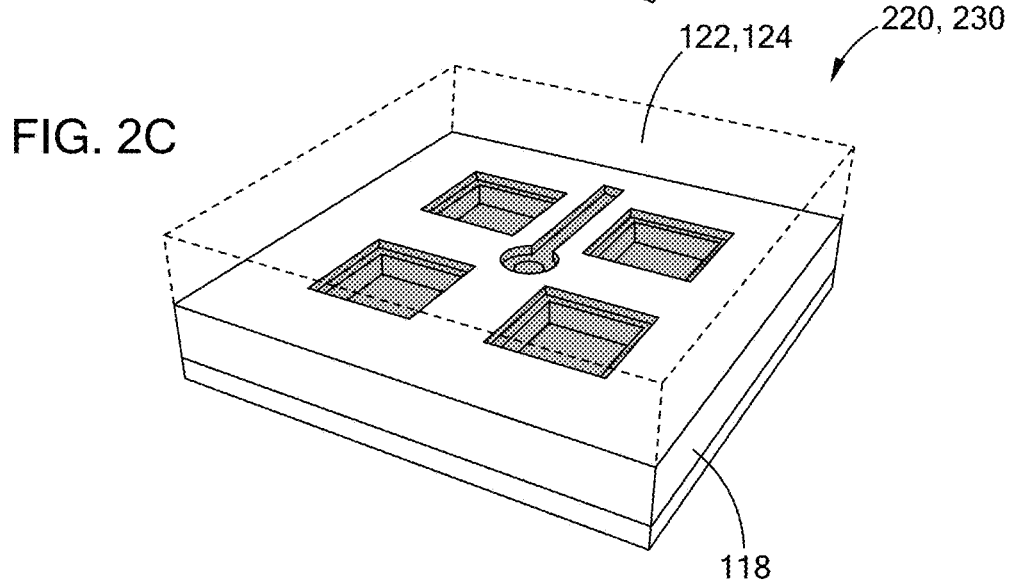

Referring to FIG. 2A, the method entails forming 200 a plurality of trenches 116 in a surface of a mold 118, and then coating 210 surfaces of the trenches 116 with an electrically conductive coating 120, as shown in FIG. 2B. An uncured elastomer 122 is applied 220 to the surface of the mold 118 so as to fill the trenches 116 and cover the surface, as illustrated in FIG. 2C. The uncured elastomer 122 is then partially cured 230 to form a tacky elastomeric body 124 comprising protruding regions defined by the trenches that contact and attach to the electrically conductive coating 120. The tackiness of the elastomeric body 124 is due to the (only) partial curing of the elastomer.

Figure 2D:
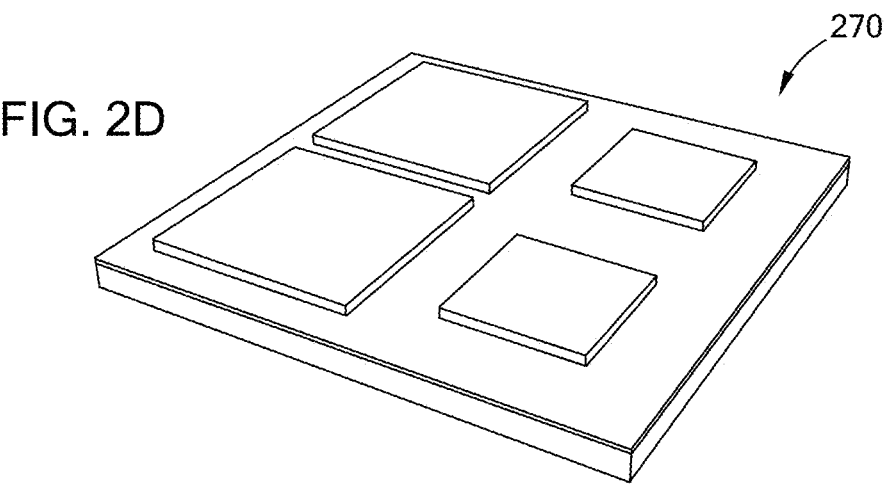
FIGS. 2D-2E show exemplary steps in fabricating inorganic functional components on a donor substrate prior to transfer to the receiver substrate.
Figure 2E:
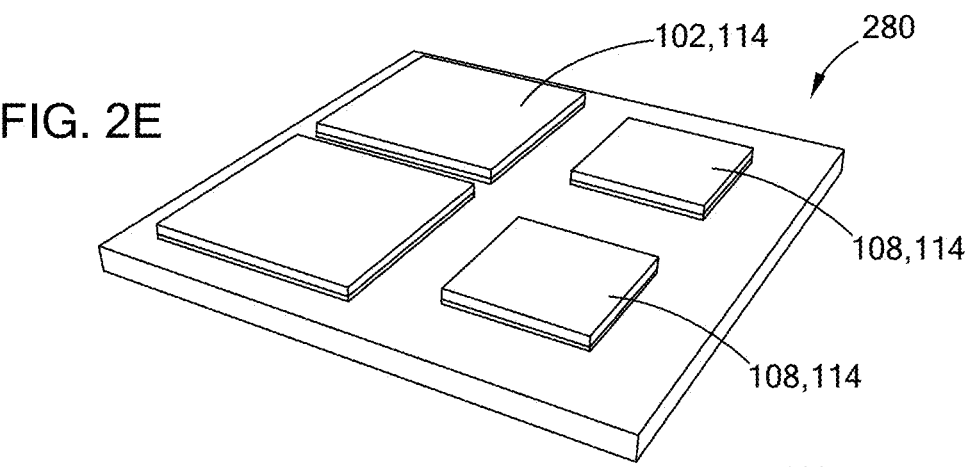
Figure 2F:
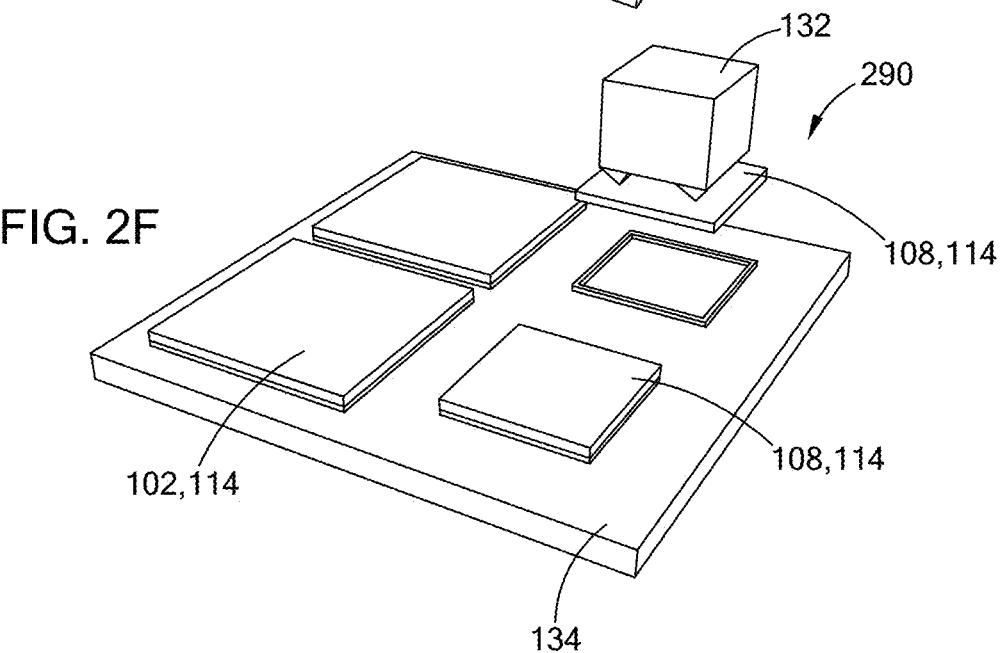
FIGS. 2F-2H show exemplary steps in transfer printing to place the inorganic functional components onto the receiver substrate followed by curing to form a hybrid organic-inorganic micromirror device.
Figures 2G, 2H:
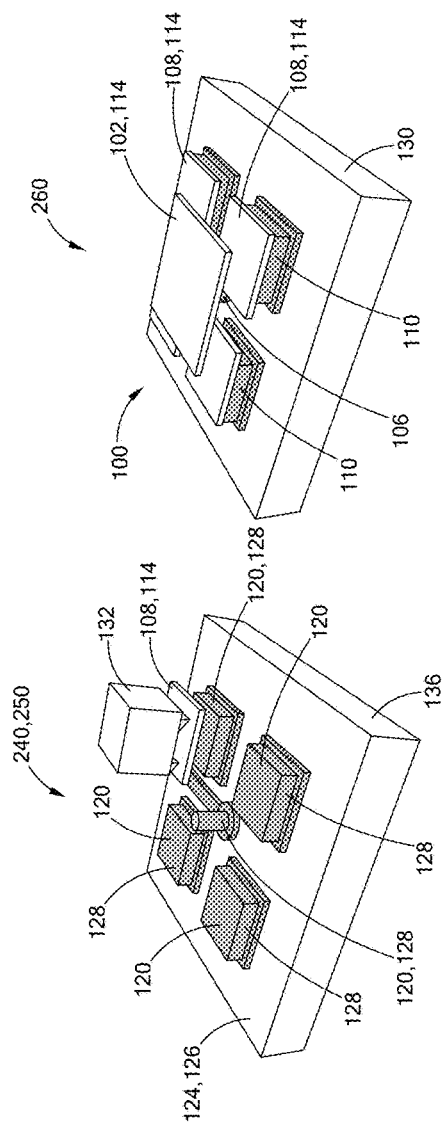
Figures 3A, 3B, 3C, 3D:
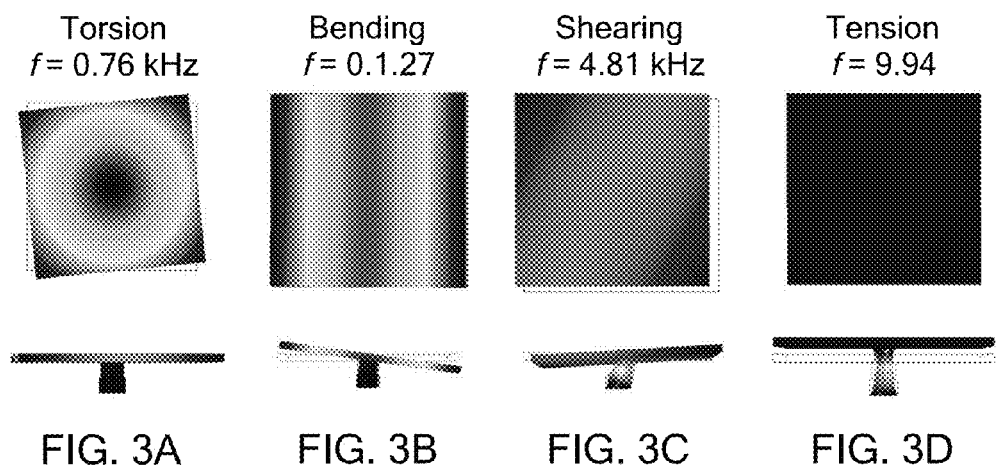
FIGS. 3A-3D show the results of a finite element modal analysis of an exemplary micromirror device. The micromirror has four different resonant modes corresponding to torsion, bending, shearing and tension/compression deformation of the conductive elastomeric support (universal joint).

Referring to FIG. 2G, the tacky elastomeric body 124 is removed 240 from the mold and may be flipped over to form a (tacky) receiver substrate 126. During the removal, the electrically conductive coating 120 remains attached to and is transferred with the protruding regions, and thus the receiver substrate 126 includes conductive-coated protrusions 128.

A plurality of functional inorganic components 114 may be placed 250 on the receiver substrate 126. More specifically, each functional inorganic component 114 may be placed in contact with one of the conductive-coated protrusions 128, as illustrated in FIG. 2G. The receiver substrate is then fully cured 260 to obtain an elastomeric substrate 130 and to bond the functional inorganic components 114 to the conductive-coated protrusions 128, as shown in FIG. 2H; thus, a hybrid organic-inorganic MEMS device is formed. When the MEMS device is a micromirror device 100, the functional inorganic components 114 may include a micromirror 102 and a plurality of electrodes 108, each comprising an electrically conductive material such as a doped semiconductor, a metal or an alloy, as described above. The uncured elastomer employed to form the receiver substrate 126 may comprise an uncured polymer selected from the group consisting of uncured polydimethylsiloxane (PDMS) and uncured polyurethane (PU). The mold 118 shown in FIG. 2A may comprise an epoxy structure formed on a substrate (such as silicon wafer or glass), and the trenches 116 may be formed in the surface of the mold 118 by photolithographic patterning of the epoxy.

The coating of the trenches 116 with the conductive coating 120 may entail applying a dispersion of conductive particles in a solvent to the mold and then evaporating the solvent, thereby depositing the conductive particles in one or more layers on the surface of the mold and in the trenches. The conductive particles may be removed from the surface of the mold (e.g., using pressure sensitive tape), leaving the conductive particles only in the trenches, and thereby forming the desired conductive coating.

Partially curing the uncured elastomer may comprise heating the uncured elastomer to a suitable curing temperature for a time duration insufficient to achieve complete curing or crosslinking. Thus, the uncured elastomer may be partially cured and may have a tacky or sticky consistency. Typically, partial curing is achieved by heating at the curing temperature of the elastomer (e.g., in the range of about 50° C.-70° C. for PDMS) for a time duration less than half of the full curing duration (e.g., about 1 hour or less at 60° C. for PDMS). Fully curing the tacky elastomeric body may entail heating the body at the curing temperature (e.g., in the range of about 50° C.-70° C.) for a time duration sufficient to achieve complete curing or crosslinking (e.g., at least 2 hours at 60° C. for PDMS).

Placing the functional inorganic components 114 on the tacky receiver substrate 126 may be carried out by transfer printing using a microscale stamp 132, as shown in FIGS. 2F-2G. For example, the methods described in U.S. Patent Application Publication No. 2015-0352586A1, entitled "Microscale Stamp with Reversible Adhesion," which is hereby incorporated by reference in its entirety, may be employed. The microscale stamp 132 used for transfer printing may comprise a shape memory polymer.

EXAMPLE

An exemplary fabrication procedure of a micromirror device is described here. The method may include the preparation of donor and receiver substrates 134,126 and the assembly of the final devices 100. Referring to FIGS. 2D-2F, silicon mirrors 102 and electrodes 108 may be batch fabricated on their donor substrates 134 using two types of silicon-on-insulator (SOI) wafers with 20-μm-thick and 3-μm-thick device layers. FIG. 2D shows etching 270 of the device layer of an SOI wafer; FIG. 2E shows undercutting 280 of the buried oxide (BOX) layer and patterning of photoresist anchors; and FIG. 2F shows etching away of the remaining BOX layer using hydrofluoric acid, so that the inorganic functional components 114 (silicon mirrors 102 and electrodes 108) can be picked up 290 and transferred (e.g., by a microtip stamp 132) to a receiver substrate 126.

The fabrication of the elastomeric body 124 that becomes the receiver substrate 126 is shown in FIGS. 2A-2C. In this example, a three-layer-SU8 mold 118 is patterned using photolithography and is then silanized to help demolding (FIG. 2A). A carbon black (CB)/toluene dispersion is applied on the mold. After complete evaporation of the toluene, the entire mold is left coated with a substantially uniform layer of carbon black particles. Excess carbon black particles on the surface of the mold 118 can be removed by commercial pressure sensitive tapes such that only the surfaces of the trenches 116 remain coated with a conductive coating 120 of carbon black particles (FIG. 2B).

A PDMS precursor 122 is then poured onto the mold 118 and partially cured at 60° C. for 30 min, as shown in FIG. 2C. After demolding, the partially cured PDMS body 124, including conductive PDMS regions 128 and a non-conductive PDMS base 136, is mounted on a rigid glass substrate to complete the preparation of a receiver substrate 126 (FIG. 2G). Referring to FIG. 2F-2G, a deterministic transfer printing technique using a microtip elastomeric stamp 132 is employed to pick up the silicon components 114 from the donor substrate 134 and place them on the receiver substrate 126 with about 3 μm alignment accuracy. Upon completion of the pick-and-place procedure via transfer printing, the PDMS receiver substrate 124 is further cured at 60° C. for approximately 12 hours to form a fully cured elastomeric substrate 130. Accordingly, the silicon and PDMS components may be bonded together through surface hydroxyl condensation reactions. The entire transfer printing-based microassembly process, including transfer printing and thermal bonding, may be carried out with a yield of at least about 90%.

The resulting micromirror device 100 may include an elastomeric support or universal joint 106 extending from the substrate 104, a top mirror 102 on the elastomeric support 106, and four bottom electrodes 108, as shown in FIGS. 1A, 1B and 2H. In this example, the mirror 102 and electrodes 108 are made of highly doped single crystal silicon with minimal resistivity ($\rho=0.001$ Ω-cm), which can be obtained from Ultrasil Corporation. PDMS (Sylgard® 184, Dow Corning) is employed as the elastomeric material, and carbon black (CB) particles (VULCAN® XC-72, Cabot Corporation) are embedded at selected regions of the PDMS structures to form the conductive coating 120. The size of the mirror 102 and the electrodes 108 are 500 µm×500 µm×20 µm and 350 µm×350 µm×3 µm, respectively, and the universal joint 106 is 80 µm in height with a 60 µm diameter. In this example, the spacing or air gap between the mirror 102 and electrodes 108 is 37 µm.

To model the static and dynamic behaviors of the exemplary micromirror, finite element analysis is performed using COMSOL 4.3b. Referring to FIGS. 3A-3D, four modes with resonant frequencies of 0.76 kHz, 1.27 kHz, 4.81 kHz and 9.94 kHz are captured by modal analysis, corresponding to the torsion (z-axis), bending (x- and y-axis), shearing (x- and y-axis) and tension (z-axis) of the elastomeric support (or universal joint). The Young's modulus of PDMS is assumed to be 0.75 MPa in this modal analysis. It is noted that two modes exist at 1.27 kHz corresponding to the bending motions about two orthogonal scanning axes. With perfect symmetry, they degenerate to a single mode due to their identical resonant frequencies. The same holds for the two shearing modes.

Figure 4:
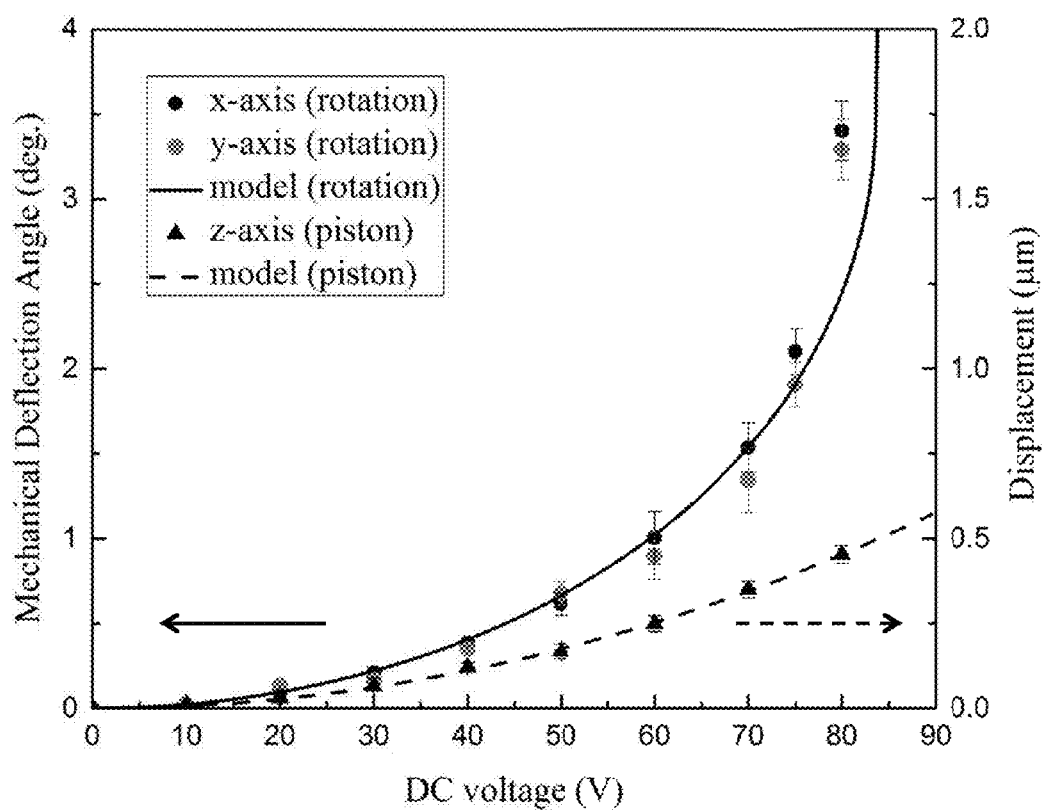
FIG. 4 shows DC characteristics of the micromirror device for x-axis rotation, y-axis rotation and z-axis compressive piston motion.
Figure 5:
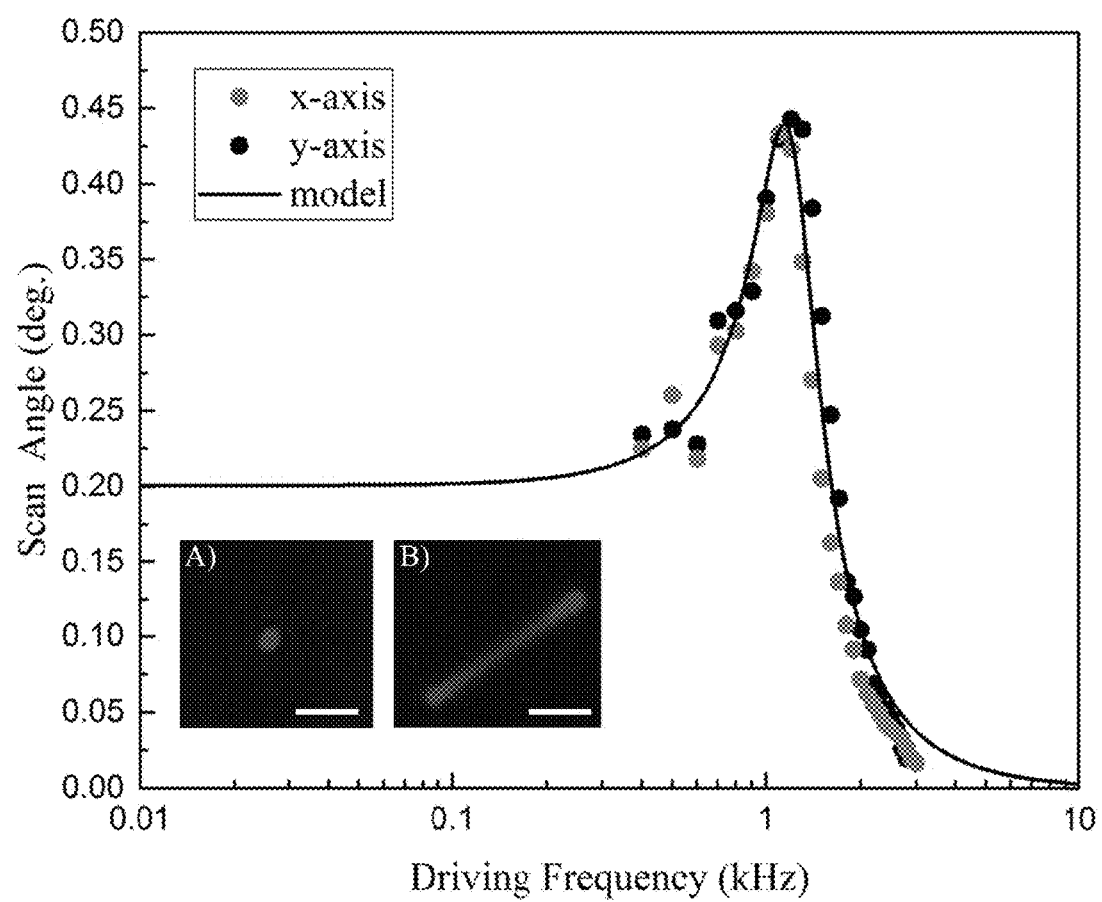
FIG. 5 shows frequency response for x- and y-axis rotations, where the resonant frequency is about 1.2 kHz for both axes. Inset images show the laser scanning trajectory at 0 Hz (A) and 1.2 Hz (B); the scale bars are 1 cm.

The static behavior of the exemplary micromirror is characterized by applying a DC voltage to the device and measuring the resultant deflection using an optical profiler (NT1000, Veeco). The results for both x- and y-axis rotations and z-axis piston from three devices are shown in FIG. 4. Due to its symmetric shape, the micromirror exhibits almost identical DC characteristics about x and y axes. Snap-down occurs under a DC voltage of 90 V. The piston stroke is also characterized by applying the same voltage to all the electrodes simultaneously. The frequency response of the exemplary device is also characterized, as shown in FIG. 5. A sinusoidal actuation signal with an DC offset expressed as $V(t)=10 \sin(2\pi f_{act} t)+10$ (V) is applied to actuate the mirror about the x- or y-axis while a collimated laser is directed onto the mirror. The length of each reflected pattern is measured under different driving frequencies to calculate the scan angles. The results are fitted to a Lorentzian function in FIG. 5. Resonant frequencies for x and y-axis rotations are determined to be 1.2 kHz, which match with the values estimated by the prior finite element analysis. The quality factors for both axes are also determined to be equal to 2.1.

Observations from FIGS. 4 and 5 reveal that the characteristics for both x and y-axes are almost identical, which is difficult to achieve using a gimbaled structure. This property can be quite beneficial as it fully utilizes the advantage of the universal joint, e.g., a maximized response along all possible directions at a single resonant frequency. In addition, the measured scan angles and resonant frequencies of the micromirror devices in this example are comparable to those of existing microfabricated mirrors, and they validate the device fabrication capabilities of the transfer printing-based microassembly technique described in this disclosure.

Although the present invention has been described in considerable detail with reference to certain embodiments thereof, other embodiments are possible without departing from the present invention. The spirit and scope of the appended claims should not be limited, therefore, to the description of the preferred embodiments contained herein. All embodiments that come within the meaning of the claims, either literally or by equivalence, are intended to be embraced therein.

Furthermore, the advantages described above are not necessarily the only advantages of the invention, and it is not necessarily expected that all of the described advantages will be achieved with every embodiment of the invention.

The invention claimed is:

1. A hybrid organic-inorganic micromirror device comprising:
    a micromirror comprising an inorganic material positioned above an elastomeric substrate, the micromirror being supported on an underside thereof by a conductive elastomeric support protruding from the elastomeric substrate, the conductive elastomeric support functioning as a universal joint and being rendered electrically conductive by an electrically conductive coating thereon;
    a plurality of electrodes disposed on the elastomeric substrate under the micromirror, the electrodes being spaced apart from each other and from the micromirror and being arranged around the conductive elastomeric support, each electrode comprising an inorganic material and being in electrical contact with an elastomeric contact region protruding from the elastomeric substrate,
    wherein, when a voltage bias is applied between the micromirror and one or more of the electrodes, the micromirror is electrostatically actuated to move in a predetermined direction.

2. The hybrid organic-inorganic micromirror device of claim 1, wherein the inorganic material is selected from the group consisting of: a doped semiconductor, a metal and an alloy.

3. The hybrid organic-inorganic micromirror device of claim 2, wherein the inorganic material is doped silicon.

4. The hybrid organic-inorganic micromirror device of claim 2, wherein the inorganic material comprises a single-crystalline structure.

5. The hybrid organic-inorganic micromirror device of claim 1, wherein the electrically conductive coating comprises a plurality of conductive particles.

6. The hybrid organic-inorganic micromirror device of claim 5, wherein the conductive particles are selected from the group consisting of: carbon particles, carbon nanotubes and metal particles.

7. The hybrid organic-inorganic micromirror device of claim 1 comprising four of the electrodes symmetrically positioned about the conductive elastomeric support.

8. The hybrid organic-inorganic micromirror device of claim 1, wherein the elastomeric substrate, the conductive elastomeric support and the elastomeric contact regions comprise an elastomer selected from the group consisting of: polydimethylsiloxane (PDMS) and polyurethane (PU).

9. The hybrid organic-inorganic micromirror device of claim 1, wherein the elastomeric substrate, the conductive elastomeric support and the elastomeric contact regions are integrally formed as a monolithic elastomeric body comprising a plurality of conductive surface portions and a substantially non-conductive bulk portion.

10. The hybrid organic-inorganic micromirror device of claim 1, wherein the micromirror comprises a length or width in the range of from about 10 microns to about 1 mm.

11. The hybrid organic-inorganic micromirror device of claim 1, wherein the voltage bias is in the range of from about 10 V to about 100 V.

* * * * *